(12) United States Patent
Fehn et al.

(10) Patent No.: US 7,129,309 B2
(45) Date of Patent: Oct. 31, 2006

(54) USE OF RHODIUM-CROSSLINKING SILICONE ELASTOMERS FOR PRODUCING BAKING MOLDS

(75) Inventors: Armin Fehn, Mehring (DE); Juergen Weidinger, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 90 days.

(21) Appl. No.: 10/631,161

(22) Filed: Jul. 31, 2003

(65) Prior Publication Data

US 2004/0022978 A1 Feb. 5, 2004

(30) Foreign Application Priority Data

Aug. 1, 2002 (DE) .............................. 102 35 267

(51) Int. Cl.
*C08G 77/08* (2006.01)

(52) U.S. Cl. .......................... 528/19; 528/32; 528/31; 525/478

(58) Field of Classification Search ................. 528/19, 528/32, 31; 525/478
See application file for complete search history.

(56) References Cited

U.S. PATENT DOCUMENTS

| | | | |
|---|---|---|---|
| 4,068,993 A | | 1/1978 | Dacey et al. |
| 4,244,912 A | | 1/1981 | Battice |
| 4,414,376 A | | 11/1983 | Siedle |
| 5,384,382 A | | 1/1995 | Mori et al. |
| 5,466,479 A | | 11/1995 | Frye |
| 5,496,961 A | | 3/1996 | Dauth et al. |
| 5,552,506 A | * | 9/1996 | Ebbrecht et al. ............. 528/15 |
| 5,561,231 A | | 10/1996 | Dauth et al. |
| 6,197,359 B1 | * | 3/2001 | Llorente Hompanera ... 426/523 |

FOREIGN PATENT DOCUMENTS

| | | |
|---|---|---|
| DE | 2 008 427 | 9/1970 |
| DE | 24 29 772 | 1/1975 |
| DE | 26 31 298 | 1/1977 |
| DE | 30 15 890 A1 | 10/1981 |
| DE | 299 16 808 | 5/2000 |
| EP | 0 819 735 A2 | 1/1998 |
| EP | 0 992 195 | 4/2000 |
| EP | 1 043 363 A2 | 10/2000 |
| FR | 2 715 407 | 7/1995 |
| FR | 2 747 882 | 10/1997 |
| FR | 2 747 886 | 10/1997 |

OTHER PUBLICATIONS

English Derwent Abstract AN 1997-552713[51] corresp. to FR 2 747 885.
English Derwent Abstract AN 1997-552714[51] corresp. to FR 2 747 886.
English Derwent Abstract AN 1995-265308[35] corresp. to FR 2 715 407.
Patent Abstract of Japan corresponding to JP 57 11 51 43 A.
Patent Abstract of Japan corresponding to JP 02 009 344 A.
English Derwent Abstract AN 1970-65891R[37] corresp. to DE 2 008 427.
English Derwent Abstract AN 1977-061427[04] corresp. to DE 26 31 298.
English Derwent Abstract AN 1981-81812D[45] corresp. to DE 30 15 890 A1.
English Derwent Abstract AN 1975-01986W[02] corresp. to DE 24 29 772.
English Derwent Abstract AN 2000-294630[26] corresp. to DE 29 916 808.
Lewis et al., "Platinum-Catalyzed Hydrosilylation—Colloid Formation as the Essential Step," J. Am. Chem. Soc. 108 (1986), p. 7228-7231.

* cited by examiner

*Primary Examiner*—Kuo-Liang Peng
(74) *Attorney, Agent, or Firm*—Brooks Kushman P.C.

(57) ABSTRACT

Shaped bodies comprise addition-crosslinked silicone elastomers crosslinked in the presence of at least one rhodium or iridium catalyst or mixtures of both catalyst types. The shaped bodies may be made transparent and colorless and are well suited for use as food and baking molds in the food industry. The catalyzed addition-crosslinkable components display excellent pot life as well as good high temperature cure.

7 Claims, No Drawings

USE OF RHODIUM-CROSSLINKING SILICONE ELASTOMERS FOR PRODUCING BAKING MOLDS

BACKGROUND OF THE INVENTION

1. Field of the Invention

The invention relates to shaped bodies.

2. Background Art

Shaped bodies, such as casting molds for the confectionary/patisserie industry, food molds, for example for shaping butter, chocolate, chocolate candies and ice cream, baking molds and baking sheets, all in general called baking molds below, even if not explicitly used for baking, are well known and are generally produced from aluminum, cast iron, clay, porcelain or glass. The use of such baking molds has the considerable disadvantage that removing the foods, called baked goods below, from the baking mold is difficult, since the baking molds are rigid and immovable.

As an improvement, therefore, in some cases complicated baking molds have been developed which need to be opened via a mechanism, thus facilitating removal of the baked goods. Such molds are not optimal, however, since firstly a complicated mechanism is necessary, and secondly only very specific geometries of the baking molds are possible. EP 0 992 195 B1 describes the use of silicone which is obtained by a platinum crosslinking process for producing patisserie molds and baking sheets. Advantages with respect to the abovementioned baking molds with this process are that the silicone is elastic and thus the baked good may be removed very easily from the baking mold, especially since the adhesion of the baked good to the silicone baking mold is extremely low, due to the nature of the silicone. Other advantages are that the silicone is inert toward foods and is considered to be physiologically harmless. Furthermore, silicone can be washed readily and has good physical and chemical resistance to oxygen, UV radiation and ozone. The same advantages also apply to food molds in general, for instance for shaping butter, chocolate/chocolate candies and ice cream, where, in addition, the advantage of the cold flexibility of silicone elastomers becomes important.

Disadvantages of silicones which are crosslinked by platinum are the yellow and/or brown discoloration of the crosslinked silicones which are visible, in particular, in the case of high-volume silicone pieces. The discolorations are caused by the platinum which, at the end of the crosslinking, is present as platinum colloid, as described in *J. Am. Chem. Soc.* 108 (1986) 7228ff. Furthermore, in many platinum-crosslinked silicones, transparency is decreased and the silicone elastomers are thus not transparent, but cloudy or "translucent."

The platinum catalysts have the further disadvantage that silicone rubbers which contain them have, after all the essential constituents have been mixed, only a limited processing time, since crosslinking proceeds even at room temperature. Although the processing time of the compositions may be increased by incorporating substances which inhibit the activity of the platinum catalyst ("inhibitors"), their use in turn reduces the curing rate of the composition.

It would be desirable to provide shaped bodies of addition-crosslinking silicones which do not have the above-mentioned disadvantages.

SUMMARY OF THE INVENTION

It has now surprisingly been found that when silicones are used which are crosslinked with rhodium and/or iridium compounds instead of with platinum, above-described disadvantages and problems do not occur.

DETAILED DESCRIPTION OF THE PREFERRED EMBODIMENT(S)

The present invention relates to shaped bodies obtainable by addition-crosslinked silicone elastomers in the presence of at least one rhodium or iridium catalyst or mixtures of both types of catalysts.

The use of silicone elastomers which crosslink via rhodium and/or iridium catalysis is distinguished by the fact that the advantages of the silicones as described in the introduction are unrestricted and, in addition, the resulting silicone elastomers are extremely transparent, display no discolorations and, even without use of inhibitors, have a significantly longer processing time at room temperature than platinum-catalyzed systems, without adversely affecting crosslinking at elevated temperatures.

The silicone compositions which can be crosslinked by rhodium and/or iridium catalysts are preferably composed of the following constituents:

(A) at least one polydiorganosiloxane having at least one unsaturated group comprising chemically bound structural units of the formula (1)

$$R_a R^1_b SiO_{(4-a-b)/2} \quad (1)$$

(B) at least one polyorganosiloxane containing at least two Si-bound hydrogen atoms comprising chemically bound structural units of the formula (II)

$$R_c H_d SiO_{(4-c-d)/2} \quad (2)$$

and (C) at least one rhodium catalyst and/or iridium catalyst which catalyzes the hydrosilylation reaction between (A) and (B), where R independently are unsubstituted or substituted ("optionally substituted") organic hydrocarbon radicals having up to 18 carbon atoms and are free of aliphatic carbon-carbon multiple bonds, $R^1$ are monovalent, optionally substituted hydrocarbon radicals having 2 to 14 carbon atoms, and have an aliphatic carbon-carbon multiple bond (double bond or triple bond), optionally bound to the silicon atom via an organic divalent linking group, a is 0, 1, 2 or 3, b is 0, 1 or 2, with the proviso that the sum of a+b is less than or equal to 3 and on average at least 2 radicals $R^1$ are present per molecule, c is 0, 1, 2 or 3 and d is 0, 1 or 2, with the proviso that the sum of c+d is less than or equal to 3 and on average at least two Si-bound hydrogen atoms are present per molecule.

Examples of radicals R include alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, aryl radicals such as the phenyl, naphthyl, anthryl and phenanthryl radicals, alkaryl radicals such as o-, m-, and p-tolyl radicals, xylyl radicals and ethylphenyl radicals, and aralkyl radicals such as the benzyl radical and the α- and β-phenylethyl radicals.

Examples of substituted radicals R are haloalkyl radicals such as the 3,3,3-trifluoro-n-propyl radical, the 2,2,2,2',2', 2'-hexafluoroisopropyl radical, and the heptafluoroisopropyl radical, and haloaryl radicals such as the o-, — and p-chlorophenyl radicals.

Preferably, radical R is a monovalent SiC-bound, optionally substituted hydrocarbon radical having 1 to 18 carbon atoms that is free from aliphatic carbon-carbon multiple bonds, more preferably a monovalent SiC-bound hydrocarbon radical having 1 to 6 carbon atoms that is free from aliphatic carbon-carbon multiple bonds, and in particular, a methyl or phenyl radical.

Radical $R^1$ may be any group able to participate in an addition reaction with an SiH-functional compound (hydrosilylation). Preferably, radical $R^1$ is an alkenyl or alkynyl group having 2 to 16 carbon atoms, such as a vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl or styryl radical, or a substituted radical such as an allyloxy or vinyloxy radical, with vinyl, allyl and hexenyl radicals being particularly preferred.

The molecular weight of constituent (A) can vary within broad ranges, for instance between $10^2$ and $10^6$ g/mol. Thus, the constituent (A) may be, for example, a relatively low molecular weight alkenyl-functional oligosiloxane such as 1,2-divinyltetramethyldisiloxane, but may also be a highly polymeric polydimethylsiloxane having chain or terminal Si-bonded vinyl groups, for example one having a molecular weight of $10^5$ g/mol (number average, determined by NMR). The structure of the molecules forming constituent (A) is also not fixed; in particular, the structure of a higher-molecular-weight, e.g. oligomeric or polymeric siloxane, can be linear, cyclic, branched or resin- or network-like. Linear and cyclic polysiloxanes are preferably composed of units of the formula $R_3SiO_{1/2}$, $R^1R_2SiO_{1/2}$, $R^1RSiO_{2/2}$ and $R_2SiO_{2/2}$, where R and $R^1$ have the meaning specified above. Branched and network-like polysiloxanes additionally contain trifunctional and/or tetrafunctional units, those of the formulae $RSiO_{3/2}$, $R^1SiO_{3/2}$ and $SiO_{4/2}$ being preferred. Obviously, mixtures of different siloxanes satisfying the criteria of the constituent (A) can also be used. Particular preference as to component (A) is given to the use of vinyl-functional, substantially linear polydiorganosiloxanes having a viscosity of 0.01 to 100,000 Pa·s, more preferably 0.1 to 30,000 Pa·s, in each case at 25° C.

As organosilicon constituent (B), all hydrogen-functional organosilicon compounds which have a viscosity of 1 to 100,000 mPa·s, preferably 10 to 10,000 mPa·s, and preferably 50 to 1000 mPa·s, in each case at 25° C., which are useful in addition-crosslinkable compositions may be used. Preferably, the organopolysiloxane (B) contains Si-bonded hydrogen in the range from 0.04 to 1.7 percent by weight, based on the total weight of the organopolysiloxane (B).

The molecular weight of the constituent (B) can likewise vary within broad limits, for instance between $10^2$ and $10^6$ g/mol. Thus, the constituent (B) may be, for example, a relatively low-molecular-weight SiH-functional oligosiloxane, such as tetramethyldisiloxane, but may also be a highly polymeric polydimethyl-siloxane having chain or terminal SiH groups, or a silicone resin having SiH groups. The structure of the molecules forming the constituent (B) is also not fixed; in particular the structure of a higher-molecular-weight, e.g. oligomeric or polymeric SiH-containing siloxane can be linear, cyclic, branched, or else resin- or network-like. Linear and cyclic polysiloxanes are preferably composed of units of the formula $R_3SiO_{1/2}$, $HR_2SiO_{1/2}$, $HRSiO_{2/2}$ and $R_2SiO_{2/2}$, where R has the meaning specified above. Branched and network-like polysiloxanes additionally contain trifunctional and/or tetrafunctional units, those of the formulae $RSiO_{3/2}$, $HSiO_{3/2}$ and $SiO_{4/2}$ being preferred. Obviously, mixtures of different siloxanes satisfying the criteria of the constituent (B) can also be used. In particular, the molecules forming the constituent (B), in addition to the obligatory SiH groups, may also at the same time contain aliphatically unsaturated groups. Particular preference is given to the use of low-molecular-weight SiH-functional compounds, such as tetrakis(dimethylsiloxy) silane and tetramethylcyclotetrasiloxane, and also higher-molecular-weight, SiH-containing siloxanes, such as poly (hydrogenmethyl)siloxane and poly (dimethylhydrogenmethyl)siloxane having a viscosity at 25° C. of 10 to 10,000 mPa.s, or analogous SiH-containing compounds in which a portion of the methyl groups is replaced by 3,3,3-trifluoropropyl or phenyl groups.

Constituent (B) is preferably present in the inventive crosslinkable overall silicone compositions in such an amount that the molar ratio of SiH groups to aliphatically unsaturated groups is 0.1 to 20, more preferably between 0.7 and 5.0. The components (A) and (B) used are commercially available products or can be prepared by processes customary in organosilicon chemistry.

Examples of component (C) include rhodium compounds such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P]$ $(C_5H_7O_2)$, $Rh(CO)_2(C_5H_7O_2)$, $RhCl_3[(R)_2S]_3$, $(R^2_3P)_2Rh$ $(CO)X$, $(R^2_3P)_3Rh(CO)H$ and $Rh_2X_2Y_4$, where X is hydrogen, chlorine, bromine or iodine, Y is ethyl, CO, $C_8H_{14}$ or 0.5 $C_8H_{12}$, R is as defined above and $R^2$ is an alkyl radical such as a methyl, ethyl and butyl radical, or an aryl radical such as phenyl and tolyl radical, or an oxygen-substituted radical such as a methoxy, ethoxy or phenoxy radical. Preferred rhodium catalysts are (acetylacetonato)carbonyl (triphenylphosphine)rhodium(I), (acetylacetonato)dicarbonylrhodium(I), carbonylchlorobis(triphenylphosphine) rhodium(I), (acetylacetonato)(1,5-cyclooctadiene)rhodium (I), rhodium(II) acetate dimer, rhodium(III) acetylacetonate and rhodium(II) octanoate dimer.

Further examples for the component (C) include iridium compounds, such as $Ir(OOCCH_3)_3$, $Ir(C_5H_7O_2)_3$, $[Ir(Z)(En)_2]_2$ and $[Ir(Z)(Dien)]_2$, where Z is chlorine, bromine, iodine or alkoxy, En is olefin such as ethylene, propylene, butene, cyclohexene or cyclooctene, and Dien is cyclooctadiene. Preferred iridium catalysts are chlorobis(cyclooctane)iridium(I) dimer, chlorobis(1,5-cyclooctadiene)iridium(I) dimer and iridium(III) acetylacetonate.

The amount of component (C) used depends on the desired crosslinking rate and on the respective use and also on economic aspects. The compositions preferably contain component (C) in amounts such that a metal content of 0.05 to 500 ppm by weight (parts by weight of metal per million parts by weight of silicone composition), more preferably 0.5 to 100 ppm by weight, an in particular 1 to 50 ppm by weight, results.

The inventive shaped bodies of silicone elastomer can optionally contain, as constituent (D), other additives, including those which have customarily been used in silicone elastomers, at a content of up to 70% by weight, preferably 0.0001 to 40% by weight. These additives can be, for example, active fillers, such as hydrophobic and hydrophilic silicas, inactive fillers, resin-like polyorganosiloxanes which are different from the siloxanes (A) and (B), dispersion aids, solvents, adhesion promoters, coloring agents such as inorganic pigments (for example cobalt blue) and organic dyes, plasticizers, organic polymers, inhibitors, stabilizers etc. These include additives such as silica flour, diatomaceous earth, clays, chalk, lithophone, soots, graphite, metal oxides, metal carbonates, metal sulfates, metal salts of carboxylic acids, metal dusts, fibers such as glass fibers, plastic fibers, plastic powder, dyes, pigments etc. In addition, compounds can be added for improving the heat stability and flame retardancy, i.e. "heat stabilizers." All stabilizers, including those previously used in silicone rubbers, may be used. Preferably, however, the heat stabilizers are transition metal compounds and soot. Preferred examples include cerium oxide, cerium octoate, cerium-siloxane compounds, iron oxide, iron octoate, iron-siloxane compounds, zinc carbonate, manganese carbonate and titanium oxide.

Examples of reinforcing fillers are preferably pyrogenic or precipitated silicas having BET surface areas of at least 50 m$^2$/g, and soots and activated carbons such as furnace soot and acetylene soot, pyrogenic and precipitated silicas having BET surface areas of at least 50 m$^2$/g being preferred. The silica fillers can have a hydrophilic character or can be made hydrophobic by known processes. When hydrophilic fillers are added, the addition of a hydrophobicizing agent is necessary. In addition, there can be present additives (D) which serve for the targeted setting of the processing time, kick-off temperature and crosslinking rate of the inventive compositions. These inhibitors and stabilizers are very well known in the field of addition-crosslinking compositions. Examples of customary inhibitors are acetylenic alcohols such as 1-ethynyl-1-cyclohexanol, 2-methyl-3-butyn-2-ol, 3,5-dimethyl-1-hexyn-3-ol and 3-methyl-1-dodecyn-3-ol; polymethylvinylcyclosiloxanes such as 1,3,5,7-tetravinyl-tetramethyltetracyclosiloxane; low-molecular-weight silicone oils containing methylvinylSiO$_{2/2}$ groups and/or R$_2$vinylSiO$_{1/2}$ terminal groups such as divinyltetra-methyldisiloxane, and tetravinyldimethyldisiloxane; trialkyl cyanurates; alkyl maleates such as diallyl maleates, dimethyl maleate and diethyl maleate; alkyl fumarates such as diallyl fumarate and diethyl fumarate; organic hydroperoxides such as cumene hydroperoxide, tert-butylhydroperoxide and pinane hydroperoxide; organic peroxides; organic sulfoxides; organic amines, diamines and amides; phosphines and phosphites; nitriles; triazoles; diaziridines; and oximes. The effect of these inhibitor additions depends on their chemical structure, so that they need to be determined individually. The inhibitor content, however, is preferably 0 to 50,000 ppm, more preferably 0 to 1000 ppm, and in particular, 0 to 100 ppm.

The inventive shaped bodies are prepared in such a manner that the constituents (A), (B), (C) and optionally constituents (D) are mixed and then crosslinked, preferably at 80 to 220° C., more preferably 150 to 190° C., in a heated casting mold, injection mold, compression mold or transfer mold. The crosslinking time for the shaped bodies depends on the geometry of the mold and the wall thickness of the shaped bodies, for example a baking mold, and is preferably between 10 sec and 5 min. The silicone baking mold is then heated in an oven with a supply of air at a maximum temperature of approximately 200° C. for 4 hours.

The inventive shaped bodies are preferably electronic components, diving goggles, pacifiers, spectacle pads, any adhesions and coatings with transparent substrates, such as glass and polycarbonate, tubes, profiles, seals and damping elements, etc. Preference is given to food molds, such as baking molds or molds for producing confectionery products such as chocolates.

Advantages of the silicone elastomers which are produced by addition crosslinking in the presence of rhodium compounds and/or iridium compounds for producing baking molds are:

1) Free choice of geometry of the mold, preferably a baking mold, thick rear sections being possible;
2) A glassy transparency making possible direct visual (noninvasive) inspection of the baked good;
3) No yellow and/or brown discoloration of the crosslinked silicone elastomers;
4) Processing time being decidedly long even without use of inhibitors; and
5) Very rapid crosslinking at elevated temperatures.

Points 3) and 4) make it possible for the processor to have a great deal of play in the processing.

EXAMPLE 1

A laboratory kneader was charged with 405 parts of a vinyldimethylsiloxy-terminated polydimethylsiloxane having a viscosity of 20 Pa·s. Following heating to 150° C., 366 parts of a hydrophobic pyrogenic silica having a specific BET surface area of 300 m$^2$/g and a carbon content of 4.2% by weight were added, producing a high-viscosity composition which was then diluted with 229 parts of the above-mentioned polydimethylsiloxane. By kneading under vacuum (10 mbar) at 150° C., volatile constituents were removed in the course of one hour. This composition is termed base composition 1.

Component A 906 parts of the base composition 1 were mixed homogeneously under vacuum in a kneader at room temperature with 7 parts of a vinyldimethylsiloxy-terminated polydimethylsiloxane having a viscosity of 20 Pa·s and 0.061 parts of bis(triphenylphosphine)carbonylrhodium(I) chloride, corresponding to 10 ppm of rhodium in the total mass of component A, dissolved in tetrahydrofuran.

Component B 931 parts of the base composition 1 were mixed on a roller at a temperature of 25° C. with 55 parts of SiH crosslinker to give a homogeneous composition. The SiH crosslinker was a trimethylsiloxy-terminal methylhydrogenpolysiloxane, Me$_3$Si—(—O—SiH(Me))$_n$—O—SiMe$_3$, which according to $^{29}$Si-NMR has a number average chain length of n=53.

Before crosslinking, the components A and B were mixed in a ratio of 1:1 using a laboratory agitator.

EXAMPLE 2

Similar to Example 1, except that instead of the bis-(triphenylphosphine)carbonylrhodium(I) chloride/tetrahydrofuran solution, 0.029 parts of rhodium(III) acetylacetonate dissolved in dichloromethane were used.

EXAMPLE 3

Similar to Example 1, except that instead of bis(triphenylphosphine)carbonylrhodium(I) chloride/tetrahydrofuran solution, 0.021 parts of carbonyltriphenylphosphinerhodium(I) acetylacetonate dissolved in dichloromethane were used.

Comparative Example 1

The procedure described in Example 1 is repeated except that the catalyst used was 16 ppm of platinum as platinum-divinyltetramethyldisiloxane complex in vinyl-terminated polydimethylsiloxane (commercially available from ABCR GmbH & Co, Germany).

Comparative Example 2

The procedure described in Example 1 is repeated except that the catalyst used was 16 ppm of platinum as platinum-divinyltetramethyldisiloxane complex in vinyl-terminated polydimethylsiloxane (commercially available from ABCR GmbH & Co, Germany) and 2 parts of ethynylcyclohexanol were used as inhibitor.

EXAMPLE 4

589.4 parts of a vinyldimethylsiloxy-terminated polydimethylsiloxane having a Brabender plasticity of 630 mkp equivalent to a mean molar mass of approximately 500,000 g/mol were mixed with 252.6 parts by mass of a hydrophobic pyrogenic silica having a BET surface area of 300 m²/g and a carbon content of 3.95% by weight, which were added in portions, for 4 hours in a kneader to provide a homogeneous composition, base composition 2.

500 parts of base composition 2 were mixed on a roller at a temperature of 20° C. with 0.1 part of inhibitor, 7.5 parts of SiH crosslinker and 2 parts of catalyst batch to give a homogeneous composition, in which the inhibitor used was 1-ethynyl-1-cyclohexanol, and the SiH crosslinker was a mixed polymer of dimethylsiloxy, methylhydrogensiloxy, and trimethylsiloxy units having a viscosity of 310 mPa.s at 25° C. and a Si-bonded hydrogen content of 0.46% by weight. The catalyst batch is prepared by homogenizing 200 parts of base composition 2 with 1.8 parts of rhodium(II) octanoate dimer (dissolved in dichloromethane) for 30 minutes in a kneader.

Comparative Example 3

The procedure described in Example 4 is repeated except that the catalyst used was 10 ppm of platinum as platinum-divinyltetramethyldisiloxane complex in vinyl-terminated polydimethylsiloxane (commercially available from ABCR GmbH & Co, Germany) and 0.5 parts of 1-ethynyl-1-cyclohexanol inhibitor were used.

The thermal curing properties of the silicone compositions prepared in Examples 1 to 4 and Comparative Examples 1 to 3 (C1, C2, C3) were measured using a Goettfert Elastograph, 7 hours after the A and B components had been mixed in a ratio of 1:1. Example 4 and Comparative Example 3 were measured immediately after mixing.

For quantitative determination of the stability, the formulations prepared were stored at room temperature (RT), the time (measured in days) for the initial viscosity value to double being determined. The measurement results are shown in Table 1.

TABLE 1

| Examples | 1 | 2 | 3 | C1 | C2 | 4 | C3 |
|---|---|---|---|---|---|---|---|
| $a_T$ [° C.] | 132 | 125 | 118 | —* | 120 | 135 | 122 |
| Storage at RT | >10 d | >10 d | >10 d | <<1 d | <8 d | >10 d | <4 d |

—*: The mixture was already crosslinked before measurement.
d: days
s: seconds

The kick-off temperature $a_T$ was determined at a heating rate of 10° C./min. The temperature corresponding to the 4% value of maximum torque was defined as the kick-off temperature. The $t_{50}$ value was determined in accordance with DIN 53529 T3. The time from the start of curing to 50% ($t_{50}$ value) of the maximum torque was determined at 150° C.

For further comparison, crosslinked silicone rubber films were produced from the silicone compositions and the mechanical properties were determined. The crosslinked silicone rubbers were produced by crosslinking the mixtures of the respective examples in a hydraulic press at a temperature of 170° C. for 10 minutes to give the silicone rubber. The demolded silicone rubber films approximately 2 mm or 6 mm thick were subjected to mechanical tests. The result can be taken from Table 2.

TABLE 2

| | Hardness [Shore A] | RF [N/mm²] | RD [%] | Appearance |
|---|---|---|---|---|
| Example 1 | 58 | 11.8 | 570 | colorless, transparent |
| Example 2 | 56 | 10.4 | 550 | colorless, transparent |
| Example 3 | 60 | 11.0 | 580 | colorless, transparent |
| Comparison C1 | —* | —* | —* | —* |
| Comparison C2 | 60 | 10.8 | 580 | slight yellow discoloration |
| Example 4 | 37 | 12.3 | 1180 | colorless, transparent |
| Comparison C3 | 39 | 13.0 | 1100 | yellow stain |

—* Already crosslinked in advance.
Hardness: Shore A hardness determined in accordance with DIN 53505,
RF: Tear strength determined in accordance with DIN 53504-S1
RD: Elongation at break determined in accordance with DIN 53504-S1

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transparent and colorless, elastomeric baking mold suitable for use with food products, comprising the addition-crosslinked product of:
   A) an unsaturated polydioganosiloxane component consisting essentially of polyorganosiloxanes containing, as unsaturated moieties, chemically bound structural units of the formula (1)

and at least one Si-H functional crosslinker containing chemically bound structural units of the formula (2)

wherein

R each independently is a $C_{1-18}$ hydrocarbon radical free of carbon-carbon multiple bonds, and optionally halo substituted;

$R^1$ are monovalent $C_{2-14}$ hydrocarbon radicals having an aliphatic carbon-carbon multiple bond;

a is 0, 1, 2, or 3, b is 0, 1, or 2, with the proviso that the sum of a+b is less than or equal to 3 and on average at least two radicals $R^1$ are present per molecule, c is 0, 1, 2, or 3, d is 0, 1, or 2, with the proviso that the sum of c+d is less than or equal to 3 and on average at least two Si-bound hydrogen atoms are present per molecule;

wherein the addition-crosslinked product is crosslinked by means of a rhodium or iridium hydrosilylation catalyst selected from the group consisting of $Rh_2(C_8H_{15}O_2)_4$, $Rh_2Cl_2Y_4$ where Y is 0.5 $C_8H_{12}$, $Ir(OOOCCH_3)_3$; $Ir(C_5H_7O_2)_3$, $[Ir(Z)(En)_2]_2$, $[Ir(Z)(Dien)]_2$, and mixtures thereof, where Z is chlorine, bromine, iodine, or alkoxy, En is olefin, and Dien is cyclooctadiene, wherein the baking mold is a baking sheet or a mold containing at least one cavity in the shape of a food product to be molded.

2. The baking mold of claim 1 which is a confectionary casting mold, a butter shaping mold, an ice cream mold, or a patisserie mold.

3. The baking mold of claim 1, further comprising hydrophobic pyrogenic silica.

4. The baking mold of claim 1, wherein the catalyst is selected from the group consisting of $Rh_2(C_8H_{15}O_2)_4$, $Rh_2Cl_2,Y_4$, and mixtures thereof.

5. The baking mold of claim 1, wherein the catalyst is selected from the group consisting of $Ir(OOCCH_3)_3$, $Ir(C_5H_7O_2)_3$, $[Ir(Z)(EN)_2]_2$, $[Ir(Z)(Dien)]_2$, and mixtures thereof.

6. The baking mold of claim 1 wherein $R^1$ is selected from the group consisting of vinyl, allyl, methallyl, 1-propenyl, 5-hexenyl, and mixtures thereof.

7. The baking mold of claim 1 wherein $R^1$ is vinyl.

* * * * *